(12) United States Patent
Choi et al.

(10) Patent No.: US 12,167,346 B2
(45) Date of Patent: Dec. 10, 2024

(54) METHOD AND DEVICE FOR CONTROLLING TRANSMISSION POWER IN WIRELESS COMMUNICATION SYSTEM

(71) Applicant: Samsung Electronics Co., Ltd., Suwon-si (KR)

(72) Inventors: Seunghoon Choi, Suwon-si (KR); Jinkyu Kang, Suwon-si (KR); Youngbum Kim, Suwon-si (KR); Taehyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 782 days.

(21) Appl. No.: 17/277,031

(22) PCT Filed: Sep. 17, 2019

(86) PCT No.: PCT/KR2019/011978
§ 371 (c)(1),
(2) Date: Mar. 17, 2021

(87) PCT Pub. No.: WO2020/060143
PCT Pub. Date: Mar. 26, 2020

(65) Prior Publication Data
US 2021/0274449 A1    Sep. 2, 2021

(30) Foreign Application Priority Data

Sep. 21, 2018  (KR) .................. 10-2018-0114386

(51) Int. Cl.
*H04B 7/185* (2006.01)
*H04W 52/36* (2009.01)
(Continued)

(52) U.S. Cl.
CPC ......... *H04W 52/367* (2013.01); *H04W 52/46* (2013.01); *H04W 88/14* (2013.01)

(58) Field of Classification Search
CPC .... H04W 52/367; H04W 52/46; H04W 88/14
(Continued)

(56) References Cited

U.S. PATENT DOCUMENTS

2007/0161394 A1* 7/2007 Kuroda ................. H04L 1/0015
                                                          455/69
2009/0082027 A1* 3/2009 Yavuz .................. H04W 52/244
                                                          455/446

(Continued)

FOREIGN PATENT DOCUMENTS

KR    10-2020-0017860 A    2/2020

OTHER PUBLICATIONS

Huawei et al., Physical layer design for NR IAB, R1-1808101, 3GPP TSG RAN WG1 #94, Aug. 10, 2018, Gothenburg, Sweden.
(Continued)

*Primary Examiner* — Temica M Beamer
(74) *Attorney, Agent, or Firm* — Jefferson IP Law, LLP

(57) ABSTRACT

Provided is an integrated access and backhaul (IAB) node for controlling transmit and receive power of a signal in a wireless communication system, the IAB node including: a transceiver; and at least one processor, wherein the at least one processor is configured to: determine a power value or an offset used for down adjustment of maximum transmit power for a backhaul link signal to be received by the IAB node, based on receive power of an access uplink signal from a terminal or maximum transmit power of the terminal; control the transceiver to transmit power adjustment information including the power value or the offset to a parent node of the IAB node or a child node of the IAB node; and control the transceiver to receive, from the parent node or the child node, a backhaul link signal in which the maximum transmit power is down-adjusted based on the power adjustment information.

12 Claims, 7 Drawing Sheets

(51) Int. Cl.
*H04W 52/46* (2009.01)
*H04W 88/14* (2009.01)

(58) Field of Classification Search
USPC .......................................... 370/318
See application file for complete search history.

(56) References Cited

U.S. PATENT DOCUMENTS

2020/0045645 A1* 2/2020 Chopra ............... H04W 52/365
2020/0053655 A1* 2/2020 Ghosh .................. H04W 88/10
2022/0167422 A1* 5/2022 Hakola ............. H04W 74/0833

OTHER PUBLICATIONS

Qualcomm Incorporated, Enhancements to support NR backhaul links, R1-1809442, 3GPP TSG RAN WG1 #94, Aug. 17, 2018, Gothenburg, Sweden.
Nokia et al., Resource allocation between backhaul and access links, R1-1808580, 3GPP TSG RAN WG1 #94, Aug. 10, 2018, Gothenburg, Sweden.
AT&T, Summary of 7.2.3.1 Enhancements to support NR backhaul links, R1-1809815, 3GPP TSG RAN WG1 #94, Aug. 23, 2018, Gothenburg, Sweden.
Ericsson, Physical-layer aspects related to IAB, R1-1807221, 3GPP TSG RAN WG1 #93, May 11, 2018, Busan, Korea.
International Search Report dated Dec. 20, 2019, issued in International Application No. PCT/KR2019/011978.
Korean Office Action dated Sep. 20, 2023, issued in Korean Patent Application No. 10-2018-0114386.

* cited by examiner

METHOD AND DEVICE FOR CONTROLLING TRANSMISSION POWER IN WIRELESS COMMUNICATION SYSTEM

CROSS-REFERENCE TO RELATED APPLICATION(S)

This application is a U.S. National Stage application under 35 U.S.C. § 371 of an International application number PCT/KR2019/011978, filed on Sep. 17, 2019, which is based on and claims priority of a Korean patent application number 10-2018-0114386, filed on Sep. 21, 2018, in the Korean Intellectual Property Office, the disclosure of which is incorporated by reference herein in its entirety.

TECHNICAL FIELD

The present disclosure relates to a method and apparatus for controlling transmit power (i.e., transmission power) in a wireless communication system.

BACKGROUND ART

To meet the increase in demand with respect to wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post long-term evolution (LTE) systems.' In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device (D2D) communication, wireless backhaul, moving networks, cooperative communication, coordinated multi-points (COMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet (or, information) technology (IT) services may be provided to collect and analyze data obtained from objects connected to each other to create new value in human life. As existing information (or, Internet) technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud radio access network (RAN) as a big data processing technology described above may be an example of convergence of 5G communication technology and IoT technology.

As described above, various services may be provided due to the development of mobile communication systems, and thus, there is need for methods of seamlessly providing such services.

DESCRIPTION OF EMBODIMENTS

Solution to Problem

Provided are an apparatus and method for effectively providing a service in a mobile communication system.

BEST MODE

Figure 1:
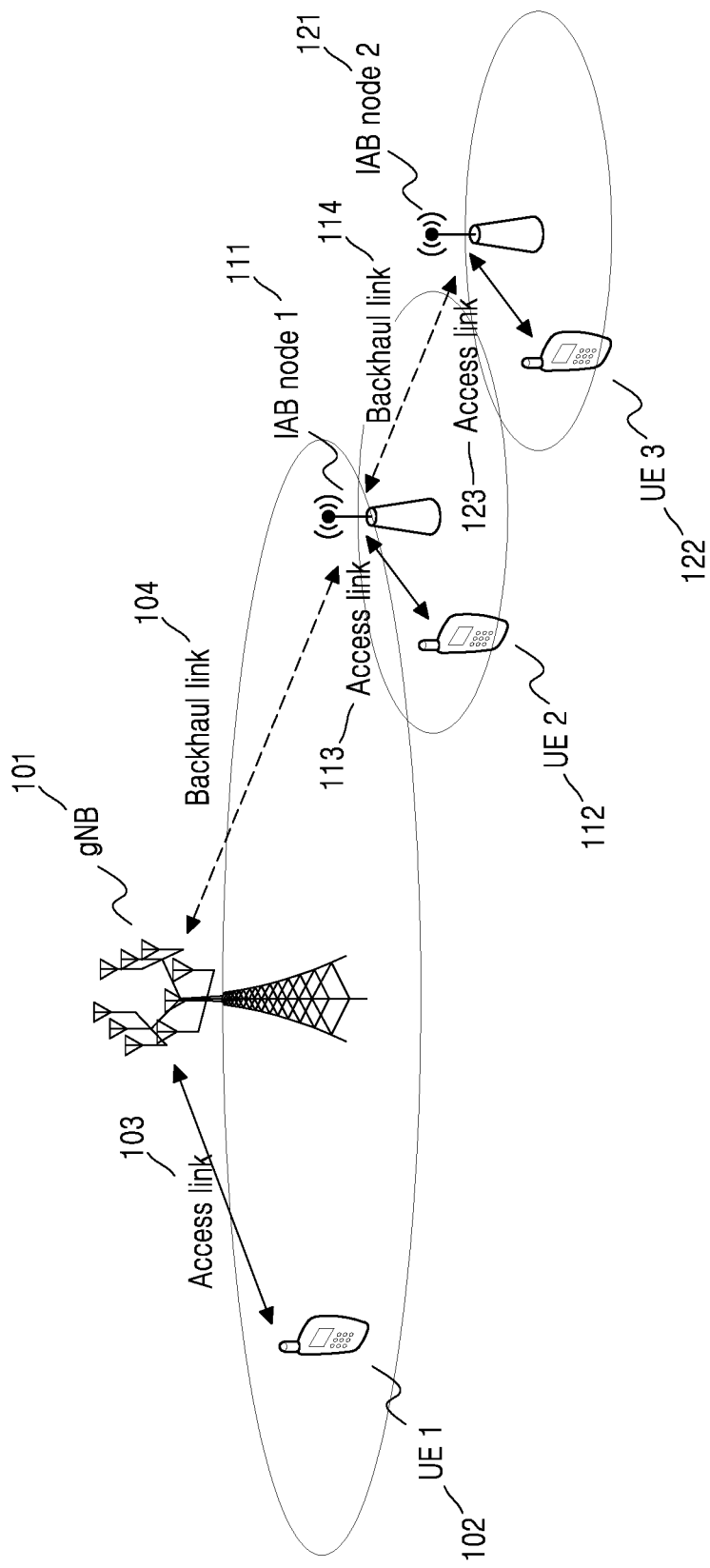
FIG. 1 is a diagram showing a communication system where integrated access and backhaul (IAB) is operated, according to an embodiment.

According to an embodiment of the present disclosure, a method of controlling transmit power in a wireless communication system includes: controlling an integrated access and backhaul (IAB) node to down-adjust a maximum value of signal transmit power of a backhaul link received by the IAB node to a certain value, based on receive power (i.e., reception power, received power) of an access uplink received from a terminal; and controlling the IAB node to down-adjust a maximum value of signal transmit power of a backhaul link transmitted by the IAB node to a certain value, based on receive power of an access downlink transmitted to the terminal, wherein the backhaul link is one of backhaul uplink or backhaul downlink.

According to an embodiment of the present disclosure, a method, performed by an integrated access and backhaul (IAB) node, of controlling transmit and receive power of a signal in a wireless communication system, includes: determining a power value or an offset used for down adjustment of maximum transmit power for a backhaul link signal to be received by the IAB node, based on receive power of an access uplink signal from a terminal or maximum transmit power of the terminal; transmitting power adjustment information including the power value or the offset to a parent node of the IAB node or a child node of the IAB node; and receiving, from the parent node or the child node, a backhaul link signal in which the maximum transmit power is down-adjusted based on the power adjustment information.

In the backhaul link signal in which the maximum transmit power is down-adjusted, the maximum transmit power may be down-adjusted to be equal to or less than the power value or is down-adjusted by a value according to the offset.

The power adjustment information may include information associated with a time period where the maximum transmit power of the backhaul link signal is down-adjusted, from among a plurality of time periods.

The method may further include scheduling transmission of the access uplink signal of the terminal in at least one time period excluding a period where the maximum transmit power of the backhaul link signal is not down-adjusted, from among the plurality of time periods.

The method may further include: receiving, from the parent node, information associated with transmit power of a backhaul downlink signal; and receiving the backhaul downlink signal in which maximum transmit power is down-adjusted for at least a part of a total reception time period, based on the information associated with the transmit power of the backhaul downlink signal.

The method may further include: receiving power adjustment information associated with the child node; down-adjusting maximum transmit power of a backhaul downlink signal to be transmitted to the child node, based on the power adjustment information associated with the child node; and transmitting, to the child node, the backhaul downlink signal in which the maximum transmit power is down-adjusted.

The method may further include adjusting a value of transmit power of an access downlink signal to be transmitted to the terminal to a value equal to or less than, or a value equal to or greater than a value of transmit power of the backhaul downlink signal to be transmitted to the child node by a certain value.

The method may further include: receiving, from the parent node, information indicating transmit power for backhaul uplink signal transmission of the IAB node; determining total transmit power for simultaneously transmitting at least two of the backhaul uplink signal to the parent node, a backhaul downlink signal to the child node, or an access downlink signal to the terminal, based on the information indicating the transmit power; in case that the total transmit power exceeds maximum transmit power of the IAB node, determining whether to transmit information with low priority or whether to down-adjust transmit power of the information with low priority, based on a pre-set priority rule associated with information to be transmitted; and simultaneously transmitting at least two of the backhaul uplink signal to the parent node, the backhaul downlink signal to the child node, or the access downlink signal to the terminal, according to a result of the determining based on the pre-set priority rule.

The power value may be a value within a range of a certain value from the receive power of the access uplink signal or from the maximum transmit power of the terminal, the offset may be an offset value by which maximum transmit power of the parent node or the child node is required to be down-adjusted such that maximum receive power of the backhaul link signal is equal to or less than the power value, and the backhaul link signal in which the maximum transmit power is down-adjusted and received from the parent node or the child node may have the maximum transmit power down-adjusted to be equal to or less than the power value or down-adjusted by a value of the offset.

The transmitting of the power adjustment information to the parent node or the child node may include transmitting the power adjustment information by using at least one of an X2 interface, an Xn interface, higher layer signaling, or a physical control signal.

The power adjustment information may include information associated with a first time period where the maximum transmit power of the backhaul link signal is down-adjusted and information associated with a second time period where the maximum transmit power is not down-adjusted, from among a plurality of time periods.

The period where the maximum transmit power of the backhaul link signal is not down-adjusted may be a time period where a synchronization signal or system information through an access downlink of the parent node or child node is not transmitted.

According to an embodiment of the present disclosure, an integrated access and backhaul (IAB) node for controlling transmit and receive power of a signal in a wireless communication system includes: a transceiver; and at least one processor, wherein the at least one processor is configured to: determine a power value or an offset used for down adjustment of maximum transmit power for a backhaul link signal to be received by the IAB node, based on receive power of an access uplink signal from a terminal or maximum transmit power of the terminal; control the transceiver to transmit power adjustment information including the power value or the offset to a parent node of the IAB node or a child node of the IAB node; and control the transceiver to receive, from the parent node or the child node, a backhaul link signal in which the maximum transmit power is down-adjusted based on the power adjustment information.

In the backhaul link signal in which the maximum transmit power is down-adjusted, the maximum transmit power may be down-adjusted to be equal to or less than the power value or is down-adjusted by a value according to the offset.

The power adjustment information may include information associated with a time period where the maximum transmit power is down-adjusted, from among a plurality of time periods.

The at least one processor may be further configured to schedule transmission of the access uplink signal of the terminal in at least one time period excluding a period where the maximum transmit power of the backhaul link signal is down-adjusted, from among the plurality of time periods.

The at least one processor may be further configured to: control the transceiver to receive, from the parent node, information associated with transmit power of a backhaul downlink signal; and control the transceiver to receive the backhaul downlink signal in which maximum transmit power is down-adjusted for at least a part of a total reception time period, based on the information associated with the transmit power of the backhaul downlink signal.

The at least one processor may be further configured to: control the transceiver to receive power adjustment information associated with the child node; down-adjust maximum transmit power of a backhaul downlink signal to be transmitted to the child node, based on the power adjustment information associated with the child node; and control the transceiver to transmit, to the child node, the backhaul downlink signal in which the maximum transmit power is down-adjusted.

The at least one processor may be further configured to: control the transceiver to receive, from the parent node, information indicating transmit power for backhaul uplink signal transmission of the IAB node; determine total transmit power for simultaneously transmitting at least two of the backhaul uplink signal to the parent node, a backhaul downlink signal to the child node, or an access downlink signal to the terminal, based on the information indicating the transmit power; in case that the total transmit power exceeds maximum transmit power of the IAB node, determine whether to transmit information with low priority or whether to down-adjust transmit power of the information with low priority, based on a pre-set priority rule associated with information to be transmitted; and control the transceiver to simultaneously transmit at least two of the backhaul uplink signal to the parent node, the backhaul downlink signal to the child node, or the access downlink signal to the terminal, according to a result of the determining based on the pre-set priority rule.

The at least one processor may be further configured to adjust a value of transmit power of an access downlink signal to be transmitted to the terminal to a value equal to or less than, or a value equal to or greater than a value of transmit power of the backhaul downlink signal to be transmitted to the child node by a certain value.

MODE OF DISCLOSURE

Hereinafter, embodiments of the present disclosure will be described with reference to accompanying drawings. While describing the present disclosure, detailed description of related well-known functions or configurations may be omitted when it is deemed that they may unnecessarily obscure the essence of the present disclosure. Also, terms used below are defined in consideration of functions in the present disclosure, and may have different meanings according to an intention of a user or operator, customs, or the like. Thus, the terms should be defined based on the description throughout the specification.

Advantages and features of one or more embodiments of the present disclosure and methods of accomplishing the same may be understood more readily by reference to the following detailed description of the embodiments of the present disclosure and the accompanying drawings. In this regard, the embodiments of the present disclosure may have different forms and should not be construed as being limited to the descriptions set forth herein. Rather, these embodiments of the present disclosure are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

While describing the present disclosure, detailed description of related well-known functions or configurations may be omitted when it is deemed that they may unnecessarily obscure the essence of the present disclosure. Hereinafter, embodiments of the present disclosure will be described with reference to accompanying drawings.

Also, terms for identifying access nodes, terms denoting network entities, terms denoting messages, terms denoting interfaces between network entities, terms denoting various types of identification information, etc. used herein are exemplified for convenience of description. Thus, the terms used in the present disclosure are not limited and other terms denoting targets having the same technical meanings may be used.

Hereinafter, for convenience of description, the present disclosure uses terms and names defined by the 3rd Generation Partnership Project Long Term Evolution (3GPP LTE) standard or the 3GPP new radio (NR) standard. However, the present disclosure is not limited by such terms and names, and may be equally applied to systems conforming to other standards. In the present disclosure, an evolved node B (eNB) will be used interchangeably with a next generation node B (gNB) for convenience of description. In other words, a base station described as an eNB may also indicate a gNB. Also, the term 'terminal' may indicate not only mobile phones, narrow band-Internet of Things (NB-IoT) devices, and sensors, but also other wireless communication devices.

Hereinafter, a base station (BS) is an entity that assigns resources of a terminal, and may be at least one of a gNode B (gNB), an eNode B (eNB), a Node B (NB), a wireless access unit, a BS controller, or a node on a network. Examples of a terminal may include user equipment (UE), a mobile station (MS), a cellular phone, a smartphone, a computer, and a multimedia system capable of performing a communication function. The present disclosure is not limited to the above examples.

In particular, the present disclosure may be applied to 3GPP new radio (NR) (5th generation (5G) mobile communication standard). Also, the present disclosure may be applied to intelligent services (e.g., smart homes, smart buildings, smart cities, smart cars or connected cars, health care, digital education, retail business, and security and safety related services) based on 5G communication technology and IoT related technology. In the present disclosure, an eNB may be interchangeably used with a gNB for convenience of description. In other words, a base station described as an eNB may also indicate a gNB. Also, the term 'terminal' may indicate not only mobile phones, narrow band-Internet of things (NB-IoT) devices, and sensors, but also other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a user equipment (UE) or a mobile station (MS)) transmits data or a control signal to a base station (BS) (e.g., eNode B), and the DL refers to a radio link through which a BS transmits data or a control signal to a terminal. In such a multiple access scheme, data or control information of each user is identified by generally assigning and operating the data or control information such that time-frequency resources for transmitting data or control information for each user do not overlap each other, that is, such that orthogonality is established.

As a future communication system after the LTE system, that is, a 5G (or NR) communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra reliability low latency communication (hereinafter, URLLC), etc.

The eMBB aims to provide a higher data transfer rate than a data transfer rate supported by the LTE, LTE-A, or LTE-Pro system. For example, in the 5G communication system, the eMBB should be able to provide a peak data rate of 20 Gbps in a downlink and a peak data rate of 10 Gbps in an uplink from the viewpoint of one base station. In addition, the 5G communication system needs to provide the increased user perceived data rate of the terminal simultaneously with providing the peak data rate. In order to satisfy such requirements, improvement of various transmitting/receiving technologies including a further improved multiple-input and multiple-output (MIMO) transmission technology may be demanded. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHZ, thereby satisfying a data rate required in the 5G communication system.

At the same time, the mMTC is being considered to support application services such as Internet of things (IoT) in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal requires a wider coverage than other services provided by the 5G communication system. The terminals that support the mMTC should be configured as inexpensive terminals and require a very long battery lifetime, such as 10 to 15 years, because it is difficult to frequently replace batteries of the terminals.

Lastly, the URLLC is a cellular-based wireless communication system used for a specific purpose (mission-critical). For example, a service used in remote control for a robot or machinery, industrial automation, unmanned aerial vehicle, remote health care, or emergency alert may be considered. Accordingly, communication provided by the URLLC should provide very low latency and very high reliability. For example, a service supporting the URLLC should satisfy air interface latency smaller than 0.5 milliseconds and at the same time, has a packet error rate of 10-5 or less. Accordingly, for URLLC-supportive services, the 5G communication system is required to provide a transmit time interval (TTI) shorter than those for other services while securing reliable communication links by assigning a broad resource in a frequency band.

The three services, that is, eMBB, URLLC, and mMTC, of the 5G system may be multiplexed in one system and may be transmitted. In this case, the services may use different transmission and reception methods and transmission and reception parameters in order to meet their different requirements.

In the 5G system, coverage may be limited due to attenuation of a propagation path while a base station transmits or receives data to or from a terminal in a band of 6 GHz or greater, in particular, in an mm Wave band. Problems caused by the limitation of coverage may be resolved by closely arranging a plurality of relays on a propagation path between the base station and the terminal, but there may be a serious cost problem for installing an optical cable for backhaul connection between the relays.

Accordingly, instead of installing the optical cable between the relays, broadband radio frequency resources available in mm Wave may be used to transmit or receive backhaul data between the relays, thereby resolving the cost problem of installing the optical cable and efficiently using the mmWave band. A technology for transmitting or receiving backhaul data to or from a base station by using mm Wave and finally transmitting or receiving access data to or from a terminal through a plurality of relays is referred to as integrated access and backhaul (IAB), and a relay node for transmitting or receiving data to or from the base station via wireless backhaul is referred to as an IAB node. When the IAB node transmits or receives the backhaul data, data needs to be received from the base station and access data needs to be transmitted to the terminal by using a same frequency band, and due to characteristics of the IAB node of receiving the access data from the terminal and transmitting the backhaul data to the base station, the IAB node has uni-directional transmission/reception characteristics at an instant.

Accordingly, as a method for reducing transmission/reception delay caused by the uni-directional transmission/reception characteristics of the IAB node, frequency domain multiplexing (FDM) or spatial domain multiplexing (SDM) may be performed on the backhaul data (downlink data received by the IAB node from a parent IAB node and uplink data received by the IAB node from a child IAB node) and the access data (uplink data received by the IAB node from the terminal, while the IAB node receives data. Here, when the IAB node receives the data by including only one radio frequency (RF), access reception is difficult when adaptive gain control (AGC) or analog-to-digital converter (ADC) is performed due to a power difference between backhaul reception and the access reception. Accordingly, the present disclosure provides a power control scheme required when receiving backhaul downlink data.

Also, when the IAB node transmits the data, FDM/SDM may be performed on backhaul data (uplink data from the IAB node to the parent IAB node and downlink data from the IAB node to the child IAB node) and access data (downlink data from the IAB node to the terminal) to the terminal. Here, when the IAB node transmits the data by including only one RF, power of the IAB node may be limited, and operations of the IAB node at this time may need to be defined. Accordingly, the present disclosure provides a method of controlling the operations of the IAB node during transmit power limitation.

FIG. 1 is a diagram showing a communication system where IAB is operated, according to an embodiment.

In FIG. 1, a gNB 101 may be a general base station, and in the present disclosure, the gNB 101 may also be referred to as a base station or a donor base station. An IAB node 1 111 and an IAB node 2 121 are IAB nodes transmitting/receiving a backhaul link in an mm Wave band. A terminal (UE) 1 102 may transmit/receive access data to/from the gNB 101 via an access link 103. The IAB node 1 111 may transmit/receive backhaul data to/from the gNB 101 via a backhaul link 104. A terminal (UE) 2 112 may transmit/receive access data to/from the IAB node 1 111 via an access link 113. The IAB node 2 121 may transmit/receive backhaul data to/from the IAB node 1 111 via a backhaul link 114.

Accordingly, the IAB node 1 111 is a higher IAB node of the IAB node 2 121. The higher IAB node such as the IAB node 1 111 may be referred to as a parent IAB node. The IAB node 2 121 is a lower IAB node of the IAB node 1 111. The lower IAB node such as the IAB node 2 121 may be referred to as a child IAB node.

A terminal (UE) 3 122 may transmit/receive access data to/from the IAB node 2 121 via an access link 123.

Next, a backhaul link between a base station and an IAB node or between IAB nodes, and an access link between the base station and a terminal or between an IAB node and the terminal being multiplexed in radio resources in an IAB technology according to an embodiment proposed in the present disclosure will be described with reference to FIGS. 2A, 2B, 3, and 4.

Figure 2A:
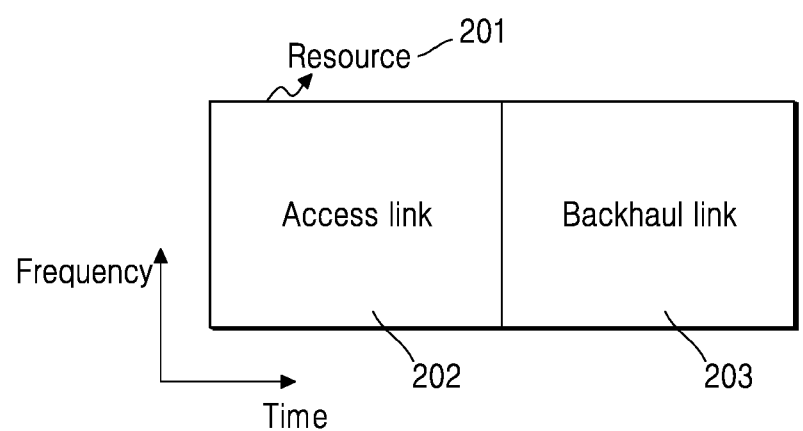
FIG. 2A is a diagram schematically showing time domain and frequency domain multiplexing between an access link and a backhaul link in IAB, according to an embodiment.
Figure 2B:
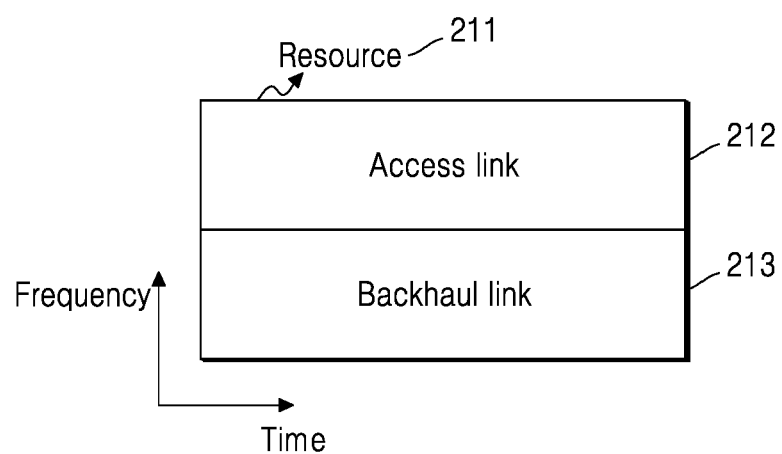
FIG. 2B is a diagram schematically showing time domain and frequency domain multiplexing between an access link and a backhaul link in IAB, according to an embodiment.

FIGS. 2A and 2B are diagrams schematically showing multiplexing between an access link and a backhaul link in IAB, according to an embodiment. FIG. 2A is a diagram showing temporal domain multiplexing (TDM) between an access link and a backhaul link in IAB. FIG. 2B is a diagram showing frequency domain multiplexing (FDM) between an access link and a backhaul link in IAB.

Referring to FIG. 2A, TDM is performed on a backhaul link 203 between a base station and an IAB node or between IAB nodes, and on an access link 202 between the base station and a terminal or between an IAB node and the terminal, in a radio resource 201.

Accordingly, data is transmitted/received between the base station and the IAB nodes in a time domain where the base station or the IAB node transmits/receives data to/from the terminal, and the base station or IAB node does not transmit/receive data to/from the terminal in a time domain where data is transmitted/received between the base station and the IAB nodes.

Referring to FIG. 2B, FDM is performed on a backhaul link 213 between a base station and an IAB node or between IAB nodes, and on an access link 212 between the base station and a terminal or between an IAB node and the terminal, in a radio resource 211.

Accordingly, it is possible to transmit/receive data between the base station and the IAB nodes in a time domain where the base station or IAB node transmits/receives data to/from the terminal, but only data transmission in a same direction is possible due to uni-directional transmission/reception characteristics of the IAB nodes. In other words, it may be possible for the IAB node to only receive backhaul data from another IAB node or the base station in a time domain where the IAB node receives data from the terminal. Also, it may be possible for the IAB node to only transmit backhaul data to another IAB node or the base station in a time domain where the IAB node transmits data to the terminal.

TDM and FDM have been described with reference to FIGS. 2A and 2B, but SDM may also be possible between an access link and a backhaul link. Accordingly, it may be possible to transmit/receive the access link and the backhaul link at the same time via SDM, but as in FDM of FIG. 2B, only data transmission in a same direction may be possible even in SDM due to uni-directional transmission/reception characteristics of the IAB nodes.

In other words, it may be possible for the IAB node to only receive backhaul data from another IAB node or the base station in a time domain where the IAB node receives data from the terminal. Also, it may be possible for the IAB node to only transmit backhaul data to another IAB node or the base station in a time domain where the IAB node transmits data to the terminal.

Information about which multiplexing technique among TDM, FDM, and SDM is to be used may be received via system information or a radio resource control (RRC) signal from an accessed base station or higher IAB nodes during initial access of the IAB node, or may be received via a backhaul link from the base station or higher IAB nodes after the initial access.

Figure 3:
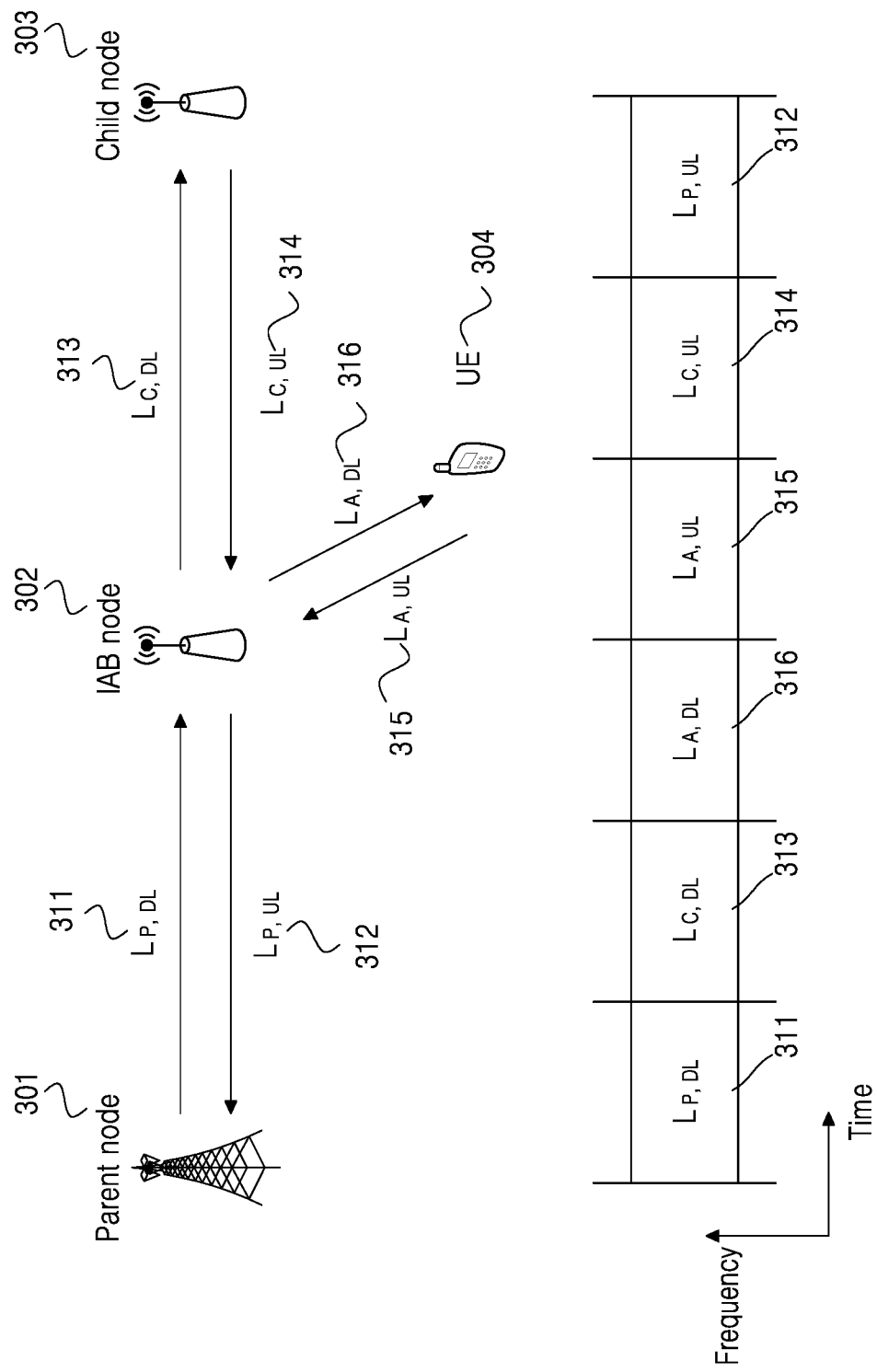
FIG. 3 is a diagram showing time domain multiplexing between an access link and a backhaul link in IAB, according to an embodiment.

FIG. 3 is a diagram showing TDM between an access link and a backhaul link in IAB, according to an embodiment.

FIG. 3 illustrates that an IAB node 302 communicates with a parent node 301, a child node 303, and a terminal (UE) 304. The parent node 301 may transmit a backhaul downlink signal to the IAB node 302 in a backhaul downlink $L_{P,DL}$ 311, and the IAB node 302 may transmit a backhaul uplink signal to the parent node 301 in a backhaul uplink $L_{P,UL}$ 312. The IAB node 302 may transmit an access downlink signal to the UE 304 in an access downlink $L_{A,DL}$ 316, and the UE 304 may transmit an access uplink signal to the IAB node 302 in an access uplink $L_{A,UL}$ 315. The IAB node 302 may transmit a backhaul downlink signal to the child node 303 in a backhaul downlink $L_{C,DL}$ 313, and the child node 303 may transmit a backhaul uplink signal to the IAB node 302 in a backhaul uplink $L_{C,UL}$ 314. In the above subscripts, P denotes a backhaul link with a parent, A denotes an access link with a UE, and C denotes a backhaul link with a child.

A link relationship described above is described based on the IAB node 302. In terms of the child node 303, a parent node is the IAB node 302 and another child node may be present under the child node 303. Also, in terms of the parent node 301, a child node is the IAB node 302 and another parent node may be present above the parent node 301.

In the present disclosure, a signal may include data, control information, a channel for transmitting the data and the control information, a reference signal required to decode the data and the control signal, or reference signals for identifying channel information.

Referring to FIG. 3, links are multiplexed in a time domain. In other words, the backhaul downlink $L_{P,DL}$ 311, the backhaul downlink $L_{C,DL}$ 313, the access downlink $L_{A,DL}$ 316, the access uplink $L_{A,UL}$ 315, the backhaul uplink $L_{C,UL}$ 314, and the backhaul uplink $L_{P,UL}$ 312 are multiplexed in a time order. An order relationship of the links shown in FIG. 3 is only an example and is not limited thereto.

According to TDM shown in FIG. 3, the links are multiplexed in a time domain in a time order, and thus, a lot of time may be taken to transmit a signal from the parent node 301 to the child node 303 via the IAB node 302 and transmit a signal to the UE 304. Accordingly, a method of transmitting backhaul links or backhaul and access links at a same time via FDM or SDM may be considered as a method for reducing time latency when transmitting a signal from the parent node 301 finally to the UE 304.

Figure 4:
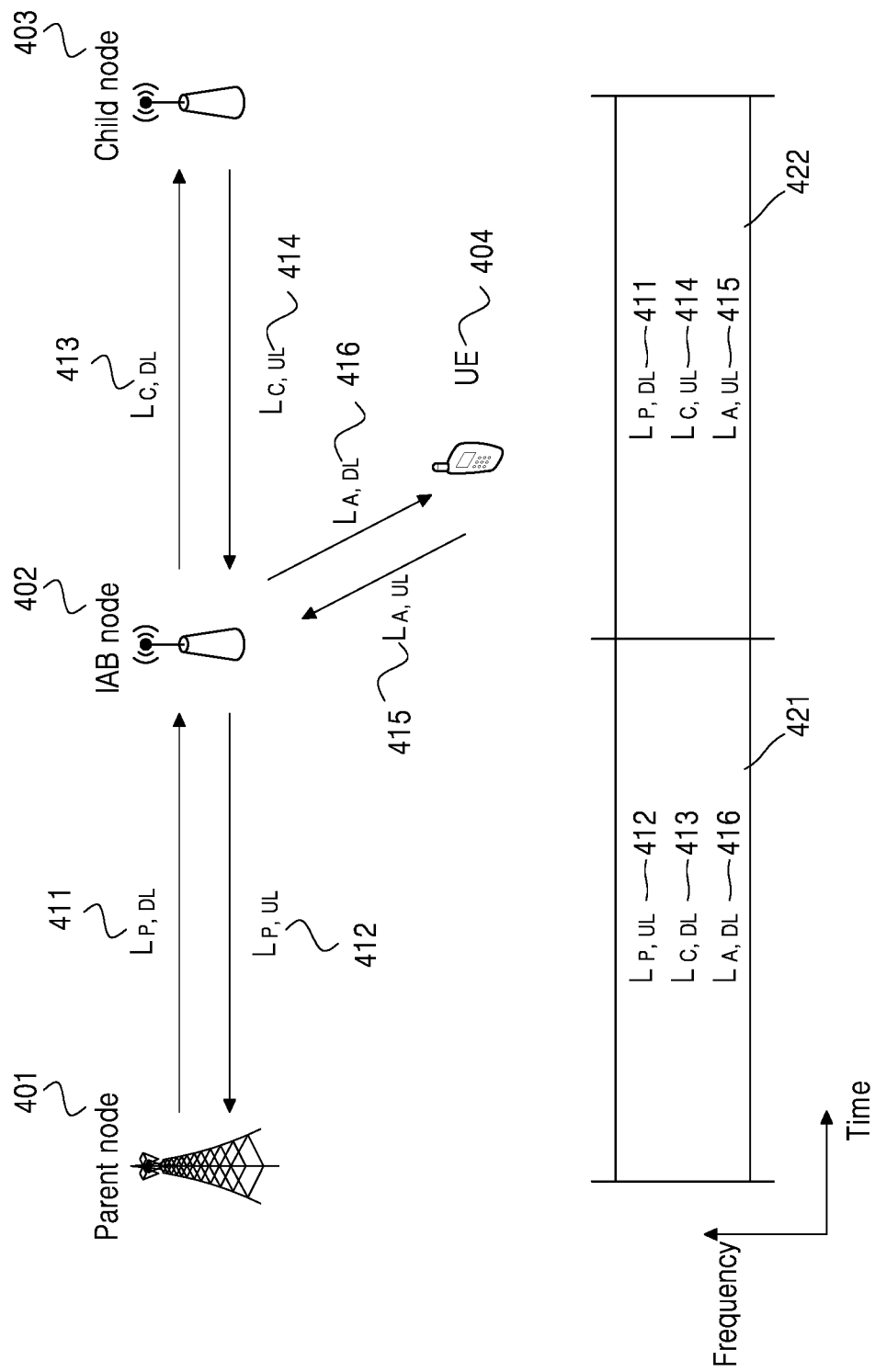
FIG. 4 is a diagram showing frequency and spatial domain multiplexing between an access link and a backhaul link in IAB, according to an embodiment.

FIG. 4 is a diagram showing FDM and SDM between an access link and a backhaul link in IAB, according to an embodiment.

A method for reducing time latency by performing FDM or SDM on backhaul links or backhaul and access links will be described with reference to FIG. 4.

Referring to FIG. 4, an IAB node 402 communicates with a parent node 401, a child node 403, and a terminal (UE) 404. The parent node 401 may transmit a backhaul downlink signal to the IAB node 402 in a backhaul downlink $L_{P,DL}$ 411, and the IAB node 302 may transmit a backhaul uplink signal to the parent node 301 in a backhaul uplink $L_{P,UL}$ 412. The IAB node 402 may transmit an access downlink signal to the UE 404 in an access downlink $L_{A,DL}$ 416, and the UE 404 may transmit an access uplink signal to the IAB node 402 in an access uplink $L_{A,UL}$ 415. The IAB node 402 may transmit a backhaul downlink signal to the child node 403 in a backhaul downlink $L_{C,DL}$ 413, and the child node 403 may transmit a backhaul uplink signal to the IAB node 402 in a backhaul uplink $L_{C,UL}$ 414. In the above subscripts, P denotes a backhaul link with a parent, A denotes an access link with a UE, and C denotes a backhaul link with a child.

A link relationship described above is described based on the IAB node 402. In terms of the child node 403, a parent node is the IAB node 402 and another child node may be present under the child node 403. Also, in terms of the parent node 401, a child node is the IAB node 402 and another parent node may be present above the parent node 401.

In the present disclosure, a signal may include data, control information, a channel for transmitting the data and the control information, a reference signal required to decode the data and the control signal, or reference signals for identifying channel information.

Referring to FIG. 4, the links are multiplexed in a frequency domain or a spatial domain.

Because an IAB node has uni-directional transmission/reception characteristics at an instant, signals that may be multiplexed in a frequency domain or a spatial domain may be limited.

For example, considering uni-directional transmission/reception characteristics of the IAB node 402, links that may be multiplexed in a time domain and capable of being transmitted by the IAB node 402 may include the backhaul uplink $L_{P,UL}$ 412, the backhaul downlink $L_{C,DL}$ 413, and the access downlink $L_{A,DL}$ 416. Accordingly, when the above links are multiplexed in the frequency domain or the spatial domain, the IAB node 402 may transmit all of the links in the time domain as indicated by a reference numeral 421 of FIG. 4.

Also, links that may be multiplexed in the time domain and capable of being received by the IAB node 402 may include the backhaul downlink $L_{P,DL}$ 411, the backhaul uplink $L_{C,UL}$ 414, and the access uplink $L_{A,UL}$ 415. Accordingly, when the above links are multiplexed in the frequency domain or the spatial domain, the IAB node 402 may transmit all of the links in the time domain as indicated by a reference numeral 422 of FIG. 4.

A method of multiplexing the links shown in FIG. 4 is only an example and is not limited thereto. For example, it is possible to multiplex only two of three links on which FDM or SDM is performed.

As shown in FIG. 4, in terms of the IAB node 402, when FDM/SDM is performed on the transmitted links in a first time domain and FDM/SDM is performed on the received links in a second time domain, the time latency of transmitting a signal from the parent node 401 finally to the UE 404 may be reduced compared to a case when TDM is performed on all of the transmitted and received links. Meanwhile, there may be two problems in performing FDM/SDM on the links.

Regarding a first problem, a case where the IAB node 402 includes only one RF and needs to receive a signal in a specific time section (i.e., time period; In the disclosure, 'time section' has the same meaning as 'time period' and is used interchangeably.) due to uni-directional transmission/reception characteristics will be described.

An indication of whether the IAB node 402 needs to receive or transmit a signal in the specific time section may be received from a donor gNB or the parent node 401, via X2 signaling (i.e., signaling via an X2 interface), Xn signaling (i.e., signaling via an Xn interface), a higher layer signal, or a physical signal. As indicated by the reference numeral 422 of FIG. 4, when FDM/SDM is performed on the backhaul downlink $L_{P,DL}$ 411, the backhaul uplink $L_{C,UL}$ 414, and the access uplink $L_{A,UL}$ 415, the IAB node 402 is able to simultaneously receive signals of the above-described links.

When the IAB node 402 receives the signals of the links by including only one RF, there may be a receive power difference between a backhaul link (for example, the backhaul downlink $L_{P,DL}$ 411) and an access link (for example, the access uplink $L_{A,UL}$ 415). Due to the receive power difference, it may be difficult for the IAB node 402 to receive the access link when AGC or ADC is performed.

When a gain is controlled or an analog signal is converted into a digital signal, the AGC or ADC may set granularity for strength of an input signal so as to convert the input signal having specific strength into an output processible by hardware.

When the granularity of the input signal is set to signal strength of a backhaul link, it may be difficult to distinguish signal strength of an access link using the set granularity because the signal strength of the access link is much smaller. Accordingly, the data reception performance and reception throughput of the access link may deteriorate.

Accordingly, the present disclosure provides a method for preventing deterioration of the data reception performance and reception throughput of the access link via various embodiments.

First Embodiment

In a first embodiment, receive power of a backhaul downlink (411 of FIG. 4) or backhaul uplink (414 of FIG. 4) is matched to receive power of an access uplink (415 of FIG. 4) so as to guarantee data reception performance of the access uplink (415 of FIG. 4) in an IAB node (402 of FIG. 4).

Figure 5:
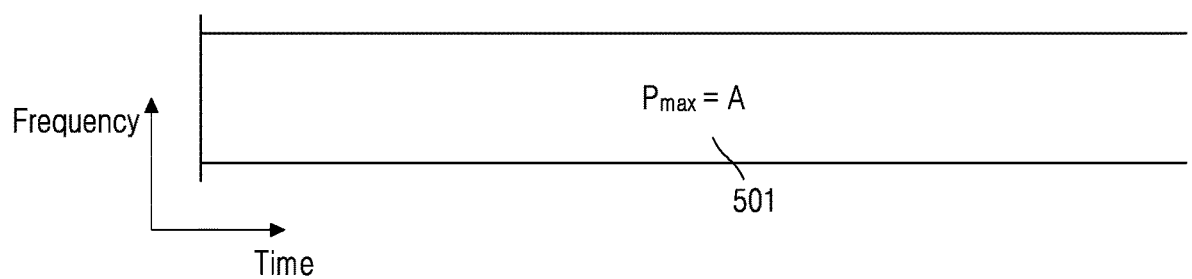
FIG. 5 is a diagram of a first embodiment for protecting an access uplink from a terminal in IAB, according to an embodiment.

FIG. 5 is a diagram of the first embodiment for protecting an access uplink from a terminal in IAB, according to an embodiment.

Referring to a reference numeral 501 of FIG. 5, a maximum value $P_{max}$ of transmit power of a backhaul downlink (411 of FIG. 4) may be down-adjusted to a certain value A so as to match receive power of the backhaul downlink (411 of FIG. 4) to receive power of an access uplink (415 of FIG. 4). A may be a value within a certain range (for example, 23 dBm≤A≤24 dBm) or a certain value (for example, A=24 dBm). According to an embodiment of the present disclosure, the certain range or the certain value may be determined based on receive power of an access uplink signal from the UE 404 or maximum transmit power capable of transmitting a signal by the UE 404. For example, the certain value may be determined to be the maximum transmit power of the UE 404 or a value equal to or less than the maximum transmit power. Alternatively, the certain value may be determined to be the receive power of the access uplink signal from the UE 404 or a value equal to or less than the receive power of the access uplink signal. Also, the certain range may be determined to be a range within x dBm from the receive power of the access uplink signal from the UE 404 or within x dBm from the maximum transmit power capable of transmitting the signal by the UE 404. Here, x may be, for example, 3. Alternatively, according to an embodiment of the present disclosure, the certain range or certain value of the certain value A may be determined according to a communication environment in a node transmitting a corresponding backhaul link, regardless of the receive power of the access uplink signal from the UE 404 or the maximum transmit power capable of transmitting the signal by the UE 404. Obviously, the above embodiment is only an example, and thus, the certain range or certain value of the certain value A is not limited thereto and may be variously determined. Hereinafter, a method of determining the certain range or certain value of the certain value A, according to the present disclosure, may be described with reference to the above description. In addition, $P_{max}$ may be adjusted to A, based on an offset value to be reduced compared to original transmittable maximum transmit power. The range or value of the certain value A, or the offset value may be coordinated between a parent node (401 of FIG. 4) and an IAB node (402 of FIG. 4), and such coordination may be performed as the parent node (401 of FIG. 4) and the IAB node (204 of FIG. 4) exchange information via X2 signaling (i.e., signaling via an X2 interface), Xn signaling (i.e., signaling via an Xn interface), or a higher layer signal.

Also, so as to match the receive power of the backhaul uplink (414 of FIG. 4) and the receive power of the access uplink (415 of FIG. 4), power control may be performed on the backhaul uplink (414 of FIG. 4) in a same manner as a backhaul downlink. In other words, a maximum value $P_{max}$ or $P_{CMAX,f,c}(i)$ of transmit power of the backhaul uplink (414 of FIG. 4) may be down-adjusted to the certain value A. A may be a value within a certain range (for example, 23 dBm≤A≤24 dBm) or a certain value (for example, A=24 dBm).

In addition, $P_{CMAX,f,c}(i)$ may be adjusted to A, based on an offset value to be reduced compared to original transmittable maximum transmit power. In $P_{CMAX,f,c}(i)$, f denotes a carrier index, c denotes a serving cell index, and i denotes a transmission occasion (a transmission instant or transmission slot). The range or value of the certain value A, or the offset value may be coordinated between the parent node (401 of FIG. 4) and the IAB node (402 of FIG. 4), and such coordination may be performed as the parent node (401 of FIG. 4) and the IAB node (204 of FIG. 4) exchange information via X2 signaling (i.e., signaling via an X2 interface), Xn signaling (i.e., signaling via an Xn interface), or a higher layer signal.

Also, the maximum value $P_{CMAX,f,c}(i)$ of the transmit power, the range or value of the certain value A, or the offset value may be transmitted from the IAB node (402 of FIG. 4) to a child node (403 of FIG. 4) via X2 signaling (i.e., signaling via an X2 interface), Xn signaling (i.e., signaling via an Xn interface), or a higher layer signal. The child node (403 of FIG. 4) may determine transmit power of the backhaul uplink (414 of FIG. 4), based on the maximum value $P_{CMAX,f,c}(i)$ of the transmit power, the range or value of the certain value A, or the offset value, and transmit a signal of the backhaul uplink (414 of FIG. 4) according to the determined transmit power.

The first embodiment may be advantageous in that reception of an access link may be guaranteed at all times when FDM/SDM is performed on a backhaul link and the access link. However, in the first embodiment, power of the backhaul link needs to be always low, and thus, the performance of the backhaul link may deteriorate. In this regard, a second embodiment for guaranteeing the performance of the backhaul link for a certain time is proposed.

Second Embodiment

In the second embodiment, so as to guarantee data reception performance of an access uplink (415 of FIG. 4) in an IAB node (402 of FIG. 4) while maintaining performance of a backhaul link for a certain time, receive power of a backhaul downlink (411 of FIG. 4) or backhaul uplink (414 of FIG. 4) is matched to receive power of the access uplink (415 of FIG. 4) during a set time section, and the receive power of the backhaul downlink (411 of FIG. 4) or backhaul uplink (414 of FIG. 4) is increased to an original value during a time section other than the set time section.

Figure 6:
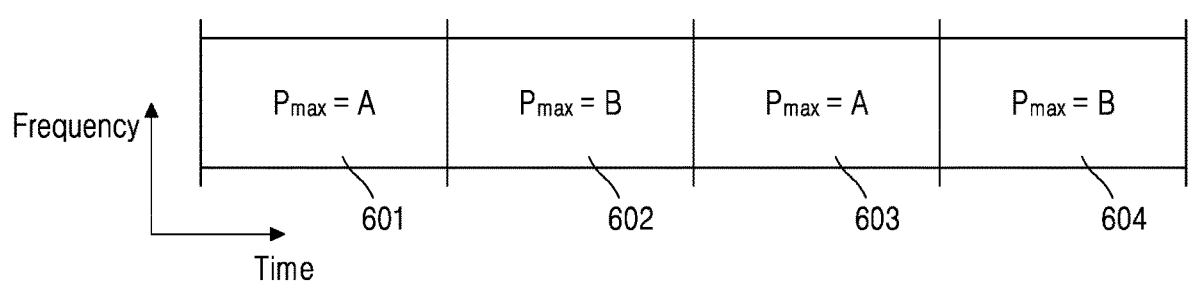
FIG. 6 is a diagram of a second embodiment for protecting an access uplink from a terminal in IAB, according to an embodiment.

FIG. 6 is a diagram of the second embodiment for protecting an access uplink from a terminal in IAB, according to an embodiment.

Referring to FIG. 6, a first type of time sections for matching receive power of a backhaul downlink (411 of FIG. 4) to receive power of an access uplink (415 of FIG. 4) may be set as reference numerals 601 and 603 of FIG. 6. The maximum value $P_{max}$ of the transmit power of the backhaul downlink (411 of FIG. 4) may be down-adjusted to the certain value A in the set time sections 601 and 603. A may be a value within a certain range (for example, 23 dBm≤A≤24 dBm) or a certain value (for example, A=24 dBm).

In addition, $P_{max}$ may be adjusted to A, based on an offset value to be reduced compared to original transmittable maximum transmit power.

The maximum value $P_{max}$ of the transmit power of the backhaul downlink (411 of FIG. 4) may be up-adjusted to an original value B before the down-adjustment, in a second type of time sections 602 and 604 that are time sections other than a time section set such that a maximum value of transmit power is down-adjusted. For example, a parent node (401 of FIG. 4) may set the transmit power of the backhaul downlink (411 of FIG. 4) to be 38 dBm that is greater than 24 dBm. The performance of the backhaul link is guaranteed during the time section where $P_{max}$ is up-adjusted, and an IAB node (402 of FIG. 4) may schedule transmission of the access uplink (415 of FIG. 4) for the UE 404 to be limited during the above-described time section.

Also, so as to match receive power of a backhaul uplink (414 of FIG. 4) to the receive power of the access uplink (415 of FIG. 4) in the first type of time sections 601 and 603, power control may be performed on the backhaul uplink (414 of FIG. 4) in a same manner as a backhaul downlink. In other words, the maximum value $P_{CMAX,f,c}(i)$ of the transmit power of the backhaul uplink (414 of FIG. 4) may be down-adjusted to the certain value A. A may be a value within a certain range (for example, 23 dBm≤A≤24 dBm) or a certain value (for example, A=24 dBm).

In addition, $P_{CMAX,f,c}(i)$ may be adjusted to A, based on an offset value to be reduced compared to original transmittable maximum transmit power. In $P_{CMAX,f,c}(i)$, f denotes a carrier index, c denotes a serving cell index, and i denotes a transmission occasion (a transmission instant or transmission slot).

The first or second type of time sections 601 and 603 or 602 or 604, the range or value of the certain value A, or the offset value may be coordinated between the parent node (401 of FIG. 4) or the IAB node (402 of FIG. 4), and coordination may be performed as the parent node (401 of FIG. 4) and the IAB node (402 of FIG. 4) exchange information via X2 signaling (i.e., signaling via an X2 interface), Xn signaling (i.e., signaling via an Xn interface), or a higher layer signal.

In the second type of time sections 602 and 604, the maximum value $P_{CMAX,f,c}(i)$ of the transmit power of the backhaul uplink (414 of FIG. 4) may be up-adjusted to the original value B before the down-adjustment. For example, the IAB node (402 of FIG. 4) may set the transmit power of the backhaul uplink (414 of FIG. 4) to be 38 dBm that is greater than 24 dBm. The performance of the backhaul link is guaranteed during the time section where $P_{CMAX,f,c}(i)$ is up-adjusted, and the IAB node (402 of FIG. 4) may schedule transmission of the access uplink (415 of FIG. 4) for the UE 404 to be limited during the above-described time section.

The child node (403 of FIG. 4) may determine transmit power of the backhaul uplink (414 of FIG. 4), based on the maximum value $P_{CMAX,f,c}(i)$ of the transmit power, the time section, the certain range and certain value, or the offset value, and transmit a signal of the backhaul uplink (414 of FIG. 4) by applying the determined transmit power.

In addition, the maximum value $P_{max}$ or $P_{CMAX,f,c}(i)$ of the transmit power, the first or second type of time sections 601 and 603 or 602 and 604, the range or value of the certain value A, or the offset value may be transmitted from the IAB node (402 of FIG. 4) to the child node (403 of FIG. 4) via X2 signaling (i.e., signaling via an X2 interface), Xn signaling (signaling via an Xn interface), or a higher layer signal. The child node (403 of FIG. 4) may determine transmit power for each time section of the backhaul uplink (414 of FIG. 4), based on the maximum value $P_{CMAX,f,c}(i)$ of the transmit power, the first or second type of time sections 601 and 603 or 602 and 604, the range or value of the certain value A, or the offset value, and transmit the signal of the backhaul uplink (414 of FIG. 4) according to the determined transmit power for each time section.

The second embodiment is advantageous in that reception of an access link may be guaranteed during a specific time section where FDM/SDM is performed on a backhaul link and the access link, and the performance of the backhaul link may be maintained as power of the backhaul link is recovered to an original value during a remaining time section. However, because the reception of the access link is guaranteed only in the specific time section in the second embodiment, the backhaul link and the access link may substantially have a same effect as TDM. In this regard, a third embodiment in which FDM/SDM may be substantially performed on a backhaul link and an access link and data performance of the access link is guaranteed is proposed.

Third Embodiment

The third embodiment is an embodiment in which FDM/SDM of a backhaul link and an access link is substantially possible while data reception performance of an access uplink (415 of FIG. 4) in an IAB node (402 of FIG. 4) is guaranteed. In the third embodiment, a method of controlling, in real-time, transmit power of a backhaul downlink so as to match receive power of the backhaul downlink (411 of FIG. 4) to receive power of an access uplink (415 of FIG. 4) is proposed.

There may be two options for the method of controlling, in real-time, the transmit power of the backhaul downlink (411 of FIG. 4) in the third embodiment.

In a first option, the transmit power of the backhaul downlink (411 of FIG. 4) is controlled by a parent node (401 of FIG. 4), and information about the transmit power controlled by the parent node (401 of FIG. 4) is indicated to an IAB node (402 of FIG. 4).

In the first option, the parent node (401 of FIG. 4) may down-adjust the maximum value $P_{max}$ of the transmit power of the backhaul downlink (411 of FIG. 4) to the certain value A as in the first embodiment, while transmitting the signal from the backhaul downlink (411 of FIG. 4) to the IAB node (402 of FIG. 4). A may be a value within a certain range (for example, 23 dBm≤A≤24 dBm) or a certain value (for example, A=24 dBm). In addition, $P_{max}$ may be adjusted to A, based on an offset value to be reduced compared to original transmittable maximum transmit power.

To down-adjust the maximum value of the transmit power, coordination may be required. Accordingly, the range or value of the certain value A, or the offset value may be pre-coordinated between the parent node (401 of FIG. 4) and the IAB node (402 of FIG. 4), and the coordination may be performed as the parent node (401 of FIG. 4) and the IAB node (204 of FIG. 4) exchange information via X2 signaling (i.e., signaling via an X2 interface), Xn signaling (i.e., signaling via an Xn interface), or a higher layer signal.

When transmitting the signal from the backhaul downlink (411 of FIG. 4) to the IAB node (402 of FIG. 4), the parent node (401 of FIG. 4) may transmit the signal of the backhaul downlink (411 of FIG. 4) by controlling the transmit power based on the coordinated value. At this time, information about the transmit power for signals (for example, a synchronization signal, a reference signal for channel estimation, a physical control channel, and the like) that are not scheduled in real-time by the backhaul downlink (411 of FIG. 4) may be pre-transmitted from the parent node (401 of FIG. 4) to the IAB node (402 of FIG. 4) via a higher layer signal.

Also, information about the transmit power for a signal, such as a physical data channel, which is capable of being scheduled in real-time by the backhaul downlink (411 of FIG. 4), may be transmitted from the parent node (401 of FIG. 4) to the IAB node (402 of FIG. 4) via a bit field of a physical control channel. The IAB node (402 of FIG. 4) may protect the access uplink (415 of FIG. 4) by receiving the signal of the backhaul downlink (411 of FIG. 4) by using the received information about the transmit power. For example, according to the received information about the transmit power, some of the signals transmitted from the parent node (401 of FIG. 4) through the backhaul downlink (411 of FIG. 4) may be transmitted without the transmit power being down-adjusted. Accordingly, the IAB node (402 of FIG. 4) may schedule a terminal to limit transmission of an access uplink during a time section where the signal of the backhaul downlink (411 of FIG. 4) received from the parent node (401 of FIG. 4) is expected to have high receive power because the transmit power is not down-adjusted. Alternatively, a value of a specific bit field of the physical control channel may be pre-mapped to a value of specific transmit power by a higher layer signal, and the IAB node (402 of FIG. 4) may receive configuration by the higher layer signal. The IAB node (402 of FIG. 4) may receive, from the parent node (401 of FIG. 4) the bit field of the physical control channel as information about the transmit power of the signal, and assume (or determine or identify) a specific value of the transmit power mapped to the received bit field by the higher layer signal. The IAB node (402 of FIG. 4) may receive data information by decoding a data channel by using the assumed value of the transmit power.

In a second option, the transmit power of the backhaul downlink (411 of FIG. 4) is controlled by the parent node (401 of FIG. 4) like the first option, but the information about the required transmit power is transmitted from the IAB node (402 of FIG. 4) to the parent node (401 of FIG. 4).

In the second option, the IAB node (402 of FIG. 4) transmits, to the parent node (401 of FIG. 4), the information about the transmit power of the backhaul downlink (411 of FIG. 4) required to protect the access uplink (415 of FIG. 4). The information about the transmit power may be transmitted to the parent node (401 of FIG. 4) via a periodic uplink control signal. For example, the information about the transmit power, such as a certain value (for example, A=24 dBm) or an offset value that needs to be reduced compared to originally transmittable maximum transmit power, may be transmitted. When transmitting the signal from the backhaul downlink (411 of FIG. 4) to the IAB node (402 of FIG. 4), the parent node (401 of FIG. 4) may control and transmit the transmit power of the backhaul downlink (411 of FIG. 4) according to the received information about the transmit power.

In the third embodiment, so as to match the receive power of the backhaul uplink (414 of FIG. 4) and the receive power of the access uplink (415 of FIG. 4), power control may be performed on the backhaul uplink (414 of FIG. 4) in a same manner as a backhaul downlink. In other words, the maximum value $P_{CMAX,f,c}(i)$ of the transmit power of the backhaul uplink (414 of FIG. 4) may be down-adjusted to the certain value A. A may be a value within a certain range (for example, 23 dBm≤A≤24 dBm) or a certain value (for example, A=24 dBm).

In addition, $P_{CMAX,f,c}(i)$ may be adjusted to A, based on an offset value to be reduced compared to original transmittable maximum transmit power. In $P_{CMAX,f,c}(i)$, f denotes a carrier index, c denotes a serving cell index, and i denotes a transmission occasion (a transmission instant or transmission slot).

The range or value of the certain value A, or the offset value may be coordinated between the parent node (401 of FIG. 4) and the IAB node (402 of FIG. 4), and such coordination may be performed as the parent node (401 of FIG. 4) and the IAB node (204 of FIG. 4) exchange information via X2 signaling (i.e., signaling via an X2 interface), Xn signaling (i.e., signaling via an Xn interface), or a higher layer signal. Also, the maximum value $P_{CMAX,f,c}(i)$ of the transmit power may be transmitted from the IAB node (402 of FIG. 4) to the child node (403 of FIG. 4) via X2 signaling (i.e., signaling via an X2 interface), Xn signaling (i.e., signaling via Xn interface), or a higher layer signal.

Also, transmit power control information may be transmitted through the bit field of the physical control channel of the backhaul downlink (413 of FIG. 4) transmitted by the IAB node (402 of FIG. 4) to the child node (403 of FIG. 4). The child node (403 of FIG. 4) may determine the transmit power of the backhaul uplink (414 of FIG. 4) according to the received maximum value $P_{CMAX,f,c}(i)$ of the transmit power and the transmit power control information, and transmit the signal of the backhaul uplink (414 of FIG. 4) by applying the determined transmit power.

When the parent node (401 of FIG. 4) transmits the signal to the backhaul downlink (411 of FIG. 4) by controlling the transmit power in real-time in the third embodiment, the transmitted signal of the backhaul downlink (411 of FIG. 4) may affect the transmit power of the access downlink of the parent node (401 of FIG. 4) transmitted from another frequency domain due to transmit power control. Accordingly, the transmitted signal of the backhaul downlink (411 of FIG. 4) may affect reception of a synchronization signal or system information of the terminal connected to the parent node (401 of FIG. 4).

Accordingly, the first and second options of the third embodiment is applicable only in a certain time section. The certain time section may be set to be a section where the synchronization signal or system information of the terminal is not transmitted. Accordingly, the parent node (401 of FIG. 4) may transmit the signal of the backhaul downlink (411 of FIG. 4) by applying the first and second options only in the certain time section, and transmit the signal of the backhaul downlink (411 of FIG. 4) without applying the third embodiment in a time section other than the certain time section. The certain time section may be coordinated between the parent node (401 of FIG. 4) and the IAB node (402 of FIG. 4), and such coordination may be performed as the parent node (401 of FIG. 4) and the IAB node (204 of FIG. 4) exchange information via X2 signaling (i.e., signaling via an X2 interface), Xn signaling (i.e., signaling via an Xn interface), or a higher layer signal.

The matching of power of the backhaul downlink (411 of FIG. 4) to power of the access uplink (415 of FIG. 4) in the first through third embodiments may denote, for example, adjusting of a difference between the power of the backhaul downlink (411 of FIG. 4) and the power of the access uplink (415 of FIG. 4) to be within X dB (for example, X=3). X may be defined by the standard and may be transmitted/received between nodes (a parent node, an IAB node, and a child node) via X2 signaling (i.e., signaling via an X2 interface), Xn signaling (i.e., signaling via an Xn interface), or a higher layer signal.

Also, as the transmit power for the signal of the backhaul downlink (411 of FIG. 4) is down-adjusted in the first through third embodiments, the transmit power of the access downlink of the parent node (401 of FIG. 4) transmitted in another frequency domain may be relatively high, and thus, in-band emission may cause a problem in reception of the signal of the backhaul downlink (411 of FIG. 4). Accordingly, the difference between the power of the backhaul downlink (411 of FIG. 4) and the power of the access downlink of the parent node (401 of FIG. 4) may be adjusted to be within Y dB (for example, Y=2). Y may be defined by the standard and may be transmitted/received between nodes (a parent node, an IAB node, and a child node) via X2 signaling (i.e., signaling via an X2 interface), Xn signaling (i.e., signaling via an Xn interface), or a higher layer signal.

Next, a second problem that may be present when FDM/SDM is performed on the links will be described.

Regarding a second problem, a case where the IAB node (402 of FIG. 4) includes only one RF and needs to transmit a signal in a specific time section due to uni-directional transmission/reception characteristics will be described.

An indication of whether an IAB node needs to receive or transmit a signal in the specific time section may be received from a donor gNB or the parent node (401 of FIG. 4), via X2 signaling (i.e., signaling via an X2 interface), Xn signaling (i.e., signaling via an Xn interface), a higher layer signal, or a physical signal. As indicated by the reference numeral 421 of FIG. 4, when FDM/SDM is performed on the backhaul uplink $L_{P,UL}$ 412, the backhaul downlink $L_{C,DL}$ 413, and the access downlink $L_{A,DL}$ 416, the IAB node 402 is able to simultaneously transmit signals of the above-described links.

When the IAB node 402 transmits the signals of the links by including only one RF, a situation where power of the IAB node 402 is limited may occur. For example, when the IAB node 402 is instructed by the parent node 401 to use the maximum transmit power to transmit the backhaul uplink $L_{P,UL}$ 412, a value of the transmit power that may be used by the IAB node 402 at an instant is limited, and thus the transmit power available to transmit the backhaul downlink $L_{C,DL}$ 413, the access downlink $L_{A,DL}$ 416, and the like may be limited. Also, a case opposite to the above example may occur.

Accordingly, operations of the IAB node 402 need to be defined when transmit power of IAB is limited, and in the present disclosure, a specific embodiment of the operations of the IAB node 402 is provided.

Fourth Embodiment

In a fourth embodiment, a link that is to be transmitted first is determined based on a priority rule. For example, when FDM/SDM is performed on the backhaul uplink $L_{P,UL}$ 412, the backhaul downlink $L_{C,DL}$ 413, and the access downlink $L_{A,DL}$ 416 and at least two links are to be simultaneously transmitted from the IAB node 402 as indicated by the reference numeral 421 of FIG. 4, transmit power or transmission of a link to be prioritized is determined based on transmission channels or transmission information of the links.

For example, the priority rule of the transmission channels or transmission information may be determined as follows.

First Priority: A tracking reference signal (TRS) for phase estimation of a synchronization signal or channel, a synchronization signal transmitted for discovery of IAB nodes, or a channel status information-reference signal (CSI-RS)

Second Priority: Uplink control information including hybrid automatic repeat and request acknowledgement (HARQ-ACK) Third Priority: An uplink data channel including HARQ-ACK Fourth Priority: Downlink control information, downlink data information, and CSI-RS The first priority is a channel or information to be prioritized, and importance decreases towards a posterior order compared to a prior order. The priority rule described above is one example and may be determined via the standard, but is not limited thereto. For example, information or channel to be prioritized may be determined differently from the priority rule described above, and a transmission priority may be determined by the standard.

The channel or information being prioritized may indicate that the channel or information needs to be assigned with transmit power first or needs to be always transmitted, when the transmit power is limited. The channel or information not being prioritized may indicate that the channel or information has the transmit power down-adjusted compared to the prior order or is dropped from transmission, when the transmit power is limited.

A transmission channel or transmission information may include a channel or information transmittable from the backhaul uplink $L_{P,UL}$ 412 of FIG. 4, the backhaul downlink $L_{C,DL}$ 413, and the access downlink $L_{A,DL}$ 416. When the same channel or information is transmitted from two different links, a backhaul link may be prioritized or an access link may be prioritized. Also, a transmission waveform of the links may be configured via cyclic prefix-orthogonal frequency division multiplexing (CP-OFDM) or discrete Fourier transform-spread-orthogonal frequency division multiplexing (DFT-S-OFDM), via a higher layer signal, X2 signaling (i.e., signaling via an X2 interface), or Xn signaling (i.e., signaling via an Xn interface). When two different links are transmitted in different waveforms, DFT-S-OFDM may be prioritized before CP-OFDM.

The link including the channel or information of the prior order may be first transmitted to the IAB node 402 in terms of transmit power or transmission, based on the priority rule described above. When the transmit power of the IAB node 402 is not sufficient to transmit the link including the channel or information of the prior order, transmit power may be reduced or transmission may be dropped for a link including channel or information of a posterior order.

In the fourth embodiment, when FDM/SDM is performed on the backhaul uplink $L_{P,UL}$ 412, the backhaul downlink $L_{C,DL}$ 413, and the access downlink $L_{A,DL}$ 416, and the backhaul uplink $L_{P,UL}$ 412, the backhaul downlink $L_{C,DL}$ 413, and the access downlink $L_{A,DL}$ 416 are transmitted from the IAB node 402, a difference of power between at least two of the transmitted links may be adjusted to be within Z dB (for example, Z=1). Z may be defined by the standard and may be transmitted/received between nodes (a parent node, an IAB node, and a child node) via X2 signaling (i.e., signaling via an X2 interface), Xn signaling (i.e., signaling via an Xn interface), or a higher layer signal.

Figure 7:
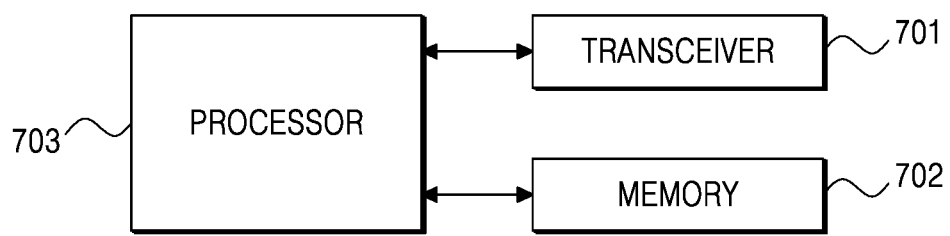
FIG. 7 is a diagram of a structure of a terminal, according to an embodiment.
Figure 8:
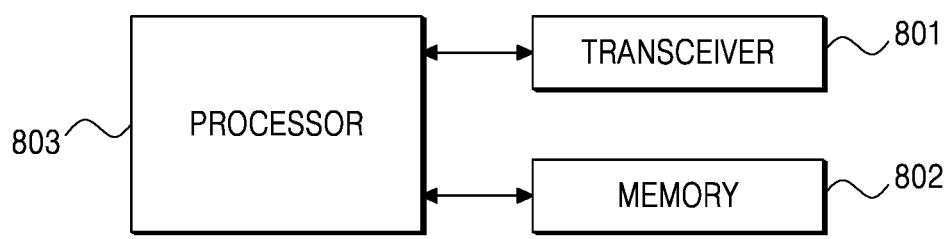
FIG. 8 is a diagram of a structure of a base station, according to an embodiment.
Figure 9:
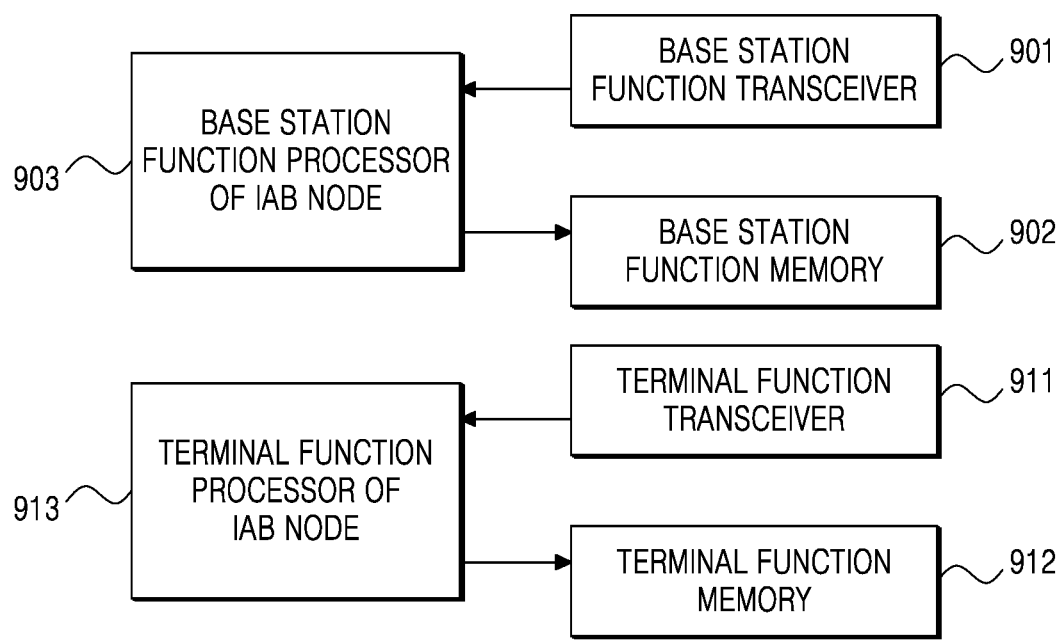
FIG. 9 is a diagram of a structure of an IAB node, according to an embodiment.

Structures of a terminal, base station, and apparatus of an IAB node capable of performing embodiments of the present disclosure are respectively shown in FIGS. 7, 8, and 9. According to an embodiment, transceivers, processors, and memories of the base station, terminal, and apparatus of the IAB node may each operate to perform transmission/reception methods of the base station (donor base station) transmitting/receiving a backhaul link to/from the IAB node via mmWave and the terminal transmitting/receiving an access link with the IAB node, while the backhaul link or access link is transmitted/received via the IAB node in a 5G communication system.

FIG. 7 is a block diagram of a structure of a terminal, according to an embodiment. As shown in FIG. 7, the terminal may include a transceiver 701, a memory 702, and a processor 703. However, the components of the terminal are not limited thereto. For example, the terminal may include more or fewer components than those described above. In addition, the transceiver 701, the memory 702, and the processor 703 may be implemented as a single chip.

The transceiver 701 may transmit or receive a signal to or from a base station. Here, the signal may include control information and data. In this regard, the transceiver 701 may include an RF transmitter for up-converting and amplifying a frequency of a transmitted signal, and an RF receiver for amplifying low-noise and down-converting a frequency of a received signal. However, this is only an example of the transceiver 701 and components of the transceiver 701 are not limited to the RF transmitter and the RF receiver.

Also, the transceiver 701 may receive and output, to the processor 703, a signal through a wireless channel, and transmit a signal output from the processor 703 through the wireless channel.

The memory 702 may store a program and data required for operations of the terminal. Also, the memory 702 may store control information or data included in a signal obtained by the terminal. The memory 702 may be a storage medium, such as read-only memory (ROM), random access memory (RAM), a hard disk, a CD-ROM, and a DVD, or a combination of storage media.

The processor 703 may control a series of processes such that the terminal operates as described above. For example, the processor 703 may control access link transmission/reception with an IAB node, according to an embodiment.

FIG. 8 is a block diagram of a structure of a base station (donor base station), according to an embodiment. As shown in FIG. 8, the base station may include a transceiver 801, a memory 802, and a processor 803. However, the components of the base station are not limited thereto. For example, the base station may include more or fewer components than those described above. In addition, the transceiver 801, the memory 802, and the processor 803 may be implemented as a single chip.

The transceiver 801 may transmit or receive a signal to or from a terminal. Here, the signal may include control information and data. In this regard, the transceiver 801 may include an RF transmitter for up-converting and amplifying a frequency of a transmitted signal, and an RF receiver for amplifying low-noise and down-converting a frequency of a received signal. However, this is only an example of the transceiver 801 and components of the transceiver 801 are not limited to the RF transmitter and the RF receiver.

Also, the transceiver 801 may receive and output, to the processor 803, a signal through a wireless channel, and transmit a signal output from the processor 803 through the wireless channel.

The memory 802 may store a program and data required for operations of the base station. Also, the memory 802 may store control information or data included in a signal obtained by the base station. The memory 802 may be a storage medium, such as ROM, RAM, a hard disk, a CD-ROM, and a DVD, or a combination of storage media.

The processor 803 may control a series of processes such that the base station operates according to an embodiment of the present disclosure described above. For example, backhaul link transmission/reception and access link transmission/reception with an IAB node, according to an embodiment, may be controlled.

FIG. 9 is a block diagram of a structure of an IAB node, according to an embodiment. As shown in FIG. 9, the IAB node of the present disclosure may include a base station function transceiver 901, a base station function memory 902, and a base station function processor 903 of the IAB node for transmission/reception with a lower IAB node via a backhaul link.

Also, the IAB node may include a terminal function transceiver 911, a terminal function memory 912, and a terminal function processor 913 of the IAB node for an initial access to a higher IAB node and a donor base station, transmission/reception of a higher layer signal before transmission/reception via the backhaul link, and transmission/reception of the backhaul link with the higher IAB node and the donor base station.

However, the components of the IAB node are not limited thereto. For example, the IAB node may include more or fewer components than those described above. In addition, the base station function transceiver 901, the base station function memory 902, the base station function processor 903, the terminal function transceiver 911, the terminal function memory 912, and the terminal function processor 913 may be implemented as a single chip.

The base station function transceiver 901 may transmit/receive a signal to/from the lower IAB node and the terminal. Here, the signal may include control information and data. In this regard, the base station function transceiver 901 may include an RF transmitter for up-converting and amplifying a frequency of a transmitted signal, and an RF receiver for amplifying low-noise and down-converting a frequency of a received signal. However, this is only an example of the base station function transceiver 901 and components of the base station function transceiver 901 are not limited to the RF transmitter and the RF receiver.

Also, the base station function transceiver 901 may receive and output, to the base station function processor 903, a signal through a wireless channel, and transmit a signal output from the base station function processor 903 through the wireless channel.

The base station function memory 902 may store a program and data required for operations of the base station. Also, the base station function memory 902 may store control information or data included in a signal obtained from the terminal. The base station function memory 902 may be a storage medium, such as ROM, RAM, a hard disk, a CD-ROM, and a DVD, or a combination of storage media.

The base station function processor 903 may control a series of operations such that the IAB node operates like the base station, according to an embodiment of the present disclosure described above. For example, backhaul link transmission/reception with the lower IAB node and access link transmission/reception with the terminal, according to an embodiment, may be controlled.

The terminal function transceiver 911 may transmit/receive a signal to/from the donor base station and the higher IAB node. Here, the signal may include control information and data. In this regard, the terminal function transceiver 911 may include an RF transmitter for up-converting and amplifying a frequency of a transmitted signal, and an RF receiver for amplifying low-noise and down-converting a frequency of a received signal. However, this is only an example of the terminal function transceiver 911 and components of the terminal function transceiver 911 are not limited to the RF transmitter and the RF receiver.

Also, the terminal function transceiver 911 may receive and output, to the terminal function processor 913, a signal through a wireless channel, and transmit a signal output from the terminal function processor 913 through the wireless channel.

The terminal function memory 912 may store a program and data required for operations of the terminal. Also, the terminal function memory 912 may store control information or data included in a signal obtained by the terminal. The terminal function memory 912 may be a storage medium, such as ROM, RAM, a hard disk, a CD-ROM, and a DVD, or a combination of storage media.

The terminal function processor 913 of the IAB node may control a series of operations such that the lower IAB node may operate like the terminal so as to transmit/receive data to/from the donor base station or the higher IAB node, according to an embodiment of the present disclosure described above. For example, backhaul link transmission/reception with the donor base station and the higher IAB node may be controlled according to an embodiment. The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to cause the electronic device to execute the methods according to the embodiments of the present disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments of the present disclosure. However, the singular or plural form is appropriately selected for convenience of explanation and the present disclosure is not limited thereto. As such, an element expressed in a plural form may also be configured as a single element, and an element expressed in a singular form may also be configured as plural elements.

Meanwhile, the embodiments of the present disclosure described with reference to the present specification and the drawings are merely illustrative of specific examples to easily facilitate description and understanding of the present disclosure, and are not intended to limit the scope of the present disclosure. In addition, the present specification and drawings disclose exemplary embodiments of the present disclosure, and although specific terms are used, these are merely used in a general sense to easily explain the technical contents of the present disclosure and to help understanding of the present disclosure, and not intended to limit the scope of the present disclosure. In other words, it will be apparent to one of ordinary skill in the art that other modifications based on the technical ideas of the present disclosure are feasible. Also, the embodiments may be combined with each other as required.

The invention claimed is:

1. A method, performed by an integrated access and backhaul (IAB) node, of controlling transmit power in a wireless communication system, the method comprising:
    identifying a power offset associated with power adjustment for a backhaul downlink transmission to be received from a parent node of the IAB node;
    transmitting, to the parent node, power adjustment information including the power offset;
    transmitting, to the parent node, time resource configuration information associated with the power adjustment of the backhaul downlink transmission; and
    receiving, from the parent node, the backhaul downlink transmission in response to the power adjustment information.

2. The method of claim 1, further comprising:
receiving, from the parent node, information of transmission power of the backhaul downlink transmission.

3. The method of claim 1, further comprising:
receiving power adjustment information associated with a child node of the IAB node:
adjusting a transmit power of a signal of downlink to be transmitted to the child node based on the power adjustment information associated with the child node; and
transmitting, to the child node, the signal of downlink with the adjusted transmit power.

4. The method of claim 3, further comprising:
adjusting a value of transmit power of an access downlink signal to be transmitted to a terminal to a value equal to or less than, or a value equal to or greater than a value of transmit power of a backhaul downlink signal to be transmitted to the child node by a certain value.

5. The method of claim 1, further comprising:
receiving, from the parent node, information indicating transmit power for backhaul uplink signal transmission of the IAB node:
identifying total transmit power for simultaneously transmitting at least two of the backhaul uplink signal to the parent node, a backhaul downlink signal to a child node, or an access downlink signal to a terminal, based on the information indicating the transmit power:
in case that the total transmit power exceeds maximum transmit power of the IAB node, identifying whether to transmit information with low priority or whether to down-adjust transmit power of the information with low priority, based on a pre-set priority rule associated with information to be transmitted; and
simultaneously transmitting at least two of the backhaul uplink signal to the parent node, the backhaul downlink signal to the child node, or the access downlink signal to the terminal, according to a result of the identifying based on the pre-set priority rule.

6. The method of claim 1, wherein the power adjustment information comprises information related to a first time interval in which the transmit power for a signal of the backhaul downlink is down-adjusted among a plurality of time intervals, and information related to a second time interval in which the transmit power is not down-adjusted among the plurality of time intervals.

7. An integrated access and backhaul (IAB) node for controlling transmit power in a wireless communication system, the IAB node comprising:
a transceiver; and
at least one processor configured to:
identify a power offset associated with power adjustment for a backhaul downlink transmission to be received from a parent node of the IAB node,
transmit, to the parent node, power adjustment information including the offset,
transmit, to the parent node, time resource configuration information associated with the power adjustment of the backhaul downlink transmission, and
receive, from the parent node, the backhaul downlink transmission in response to the power adjustment information.

8. The IAB node of claim 7, wherein the at least one processor is further configured to:
control the transceiver to receive, from the parent node, information of transmission power of the backhaul downlink transmission.

9. The IAB node of claim 8, wherein the at least one processor is further configured to:
control the transceiver to receive power adjustment information associated with a child node of the IAB node,
adjust a transmit power of a signal of downlink to be transmitted to the child node based on the power adjustment information associated with the child node, and
control the transceiver to transmit, to the child node, the signal of downlink with the adjusted transmit power.

10. The IAB node of claim 9, wherein the at least one processor is further configured to:
adjust a value of transmit power of an access downlink signal to be transmitted to a terminal to a value equal to or less than, or a value equal to or greater than a value of transmit power of a backhaul downlink signal to be transmitted to the child node by a certain value.

11. The IAB node of claim 7, wherein the at least one processor is further configured to:
control the transceiver to receive, from the parent node, information indicating transmit power for backhaul uplink signal transmission of the IAB node, identify total transmit power for simultaneously transmitting at least two of the backhaul uplink signal to the parent node, a backhaul downlink signal to a child node, or an access downlink signal to a terminal, based on the information indicating the transmit power,
in case that the total transmit power exceeds maximum transmit power of the IAB node, identify whether to transmit information with low priority or whether to down-adjust transmit power of the information with low priority, based on a pre-set priority rule associated with information to be transmitted, and
control the transceiver to simultaneously transmit at least two of the backhaul uplink signal to the parent node, the backhaul downlink signal to the child node, or the access downlink signal to the terminal, according to a result of the identifying based on the pre-set priority rule.

12. The IAB node of claim 7, wherein the power adjustment information comprises information related to a first time interval in which the transmit power for a signal of the backhaul downlink is down-adjusted among a plurality of time intervals, and information related to a second time interval in which the transmit power is not down-adjusted among the plurality of time intervals.

* * * * *